(12) United States Patent
Jensen

(10) Patent No.: US 8,350,811 B2
(45) Date of Patent: Jan. 8, 2013

(54) SCROLL WHEEL

(76) Inventor: Jens Martin Jensen, Virum (DK)

( * ) Notice: Subject to any disclaimer, the term of this patent is extended or adjusted under 35 U.S.C. 154(b) by 219 days.

(21) Appl. No.: 13/054,880

(22) PCT Filed: Oct. 6, 2009

(86) PCT No.: PCT/DK2009/050266
§ 371 (c)(1),
(2), (4) Date: Jan. 19, 2011

(87) PCT Pub. No.: WO2010/040358
PCT Pub. Date: Apr. 15, 2010

(65) Prior Publication Data
US 2011/0128226 A1    Jun. 2, 2011

(30) Foreign Application Priority Data
Oct. 6, 2008   (DK) .................................. 2008 01403

(51) Int. Cl.
*G06F 3/033*    (2006.01)

(52) U.S. Cl. ......... 345/163; 345/157; 345/167; 345/184

(58) Field of Classification Search .................. 345/156, 345/157, 160, 163, 167, 184; 715/786, 787
See application file for complete search history.

(56) References Cited

U.S. PATENT DOCUMENTS

| | | | |
|---|---|---|---|
| 6,603,459 B2 * | 8/2003 | Matsufusa et al. | 345/156 |
| 7,042,441 B2 * | 5/2006 | Adams et al. | 345/163 |
| 7,079,110 B2 * | 7/2006 | Ledbetter et al. | 345/156 |
| 7,193,612 B2 * | 3/2007 | Lindhout et al. | 345/164 |
| 7,298,362 B2 * | 11/2007 | Wang | 345/166 |
| 7,623,652 B2 * | 11/2009 | Mori et al. | 379/367 |
| 7,710,409 B2 * | 5/2010 | Robbin et al. | 345/184 |
| 7,859,517 B2 * | 12/2010 | Zeng et al. | 345/166 |
| 7,876,306 B2 * | 1/2011 | Chiang | 345/163 |
| 7,889,172 B2 * | 2/2011 | Park et al. | 345/156 |
| 2004/0058641 A1 * | 3/2004 | Acker | 455/3.02 |
| 2005/0073195 A1 * | 4/2005 | Popilek | 307/10.1 |
| 2005/0168443 A1 * | 8/2005 | Ausbeck | 345/163 |
| 2006/0048073 A1 * | 3/2006 | Jarrett et al. | 715/784 |
| 2006/0267951 A1 | 11/2006 | Rainisto | |
| 2007/0262951 A1 | 11/2007 | Huie et al. | |
| 2008/0010616 A1 * | 1/2008 | Algreatly | 715/856 |
| 2009/0303180 A1 * | 12/2009 | Chin et al. | 345/157 |
| 2010/0223571 A1 * | 9/2010 | Krete | 715/776 |

FOREIGN PATENT DOCUMENTS

WO    2006080858 A1    8/2006

* cited by examiner

*Primary Examiner* — Joe H Cheng
(74) *Attorney, Agent, or Firm* — David A. Guerra

(57) ABSTRACT

The invention relates to a method for enabling scrolling on a display in a first direction by turning a scroll wheel of a computer mouse without the need to lift a finger from the scroll wheel during scrolling. This is obtained by switching the mode of operation of the scroll wheel from a first mode of operation, mode 1, to a second mode of operation, mode 2, by performing an action, such as holding down a specific key. The program procedure for mode 2 is such that when the scroll wheel is first turned upon switching to mode 2, a first direction of turning is de-fined. Continued turning of the scroll wheel in either the first direction of turning or another direction of turning will cause a scrolling on the display in the first direction.

20 Claims, 2 Drawing Sheets

SCROLL WHEEL

CROSS-REFERENCE TO RELATED APPLICATIONS

This application is an U.S. national phase application under 35 U.S.C. §371 based upon co-pending International Application No. PCT/DK2009/050266 filed on Oct. 6, 2009. Additionally, this U.S. national phase application claims the benefit of priority of co-pending International Application No. PCT/DK2009/050266 filed on Oct. 6, 2009, and Denmark Application No. PA 2008 01403 filed on Oct. 6, 2008. The entire disclosures of the prior applications are incorporated herein by reference. The international application was published on Apr. 15, 2010 under Publication No. WO 2010/040358.

BACKGROUND OF THE INVENTION

1. Field of the Invention

The present invention relates to the functioning of a scroll wheel. The meaning of the term "scrolling" on a computer screen or other type of display is well-known. The most common use of scroll wheels is as part of computer mice, but it is also used on certain types of control panels. Turning of a scroll wheel usually effects vertical scrolling. Left or right scrolling can sometimes be effected by pushing the scroll wheel left or right, respectively. Often, a scroll wheel will have a built-in click button that can be customized to perform a desired action.

2. Description of the Prior Art

For known scroll wheels, turning the scroll wheel in a downward direction, towards the user, results in an upward motion of content displayed on the display, and vice versa. This works well for short and slow scrolling. To keep down costs, a standard scroll wheel is usually made out of plastic and sometimes has a rubber rim. Such a wheel has a small weight and thus a small moment of inertia. The bearing friction in such a wheel is also somewhat high, another result of low-cost manufacturing. Such a wheel is not well-suited for so-called free spin, where the wheel can rotate many times before stopping due to friction. Even when the wheel is rotated quickly initiated with a quick motion of the finger, it will stop before achieving a 360 degree rotation. Scrolling through a large document thus has to be performed by repeatedly turning the wheel and lifting one's the finger. This is uncomfortable and inefficient. A wheel made partly of metal and with bearings designed for low friction can allow some amount of free spin and thus fast scrolling. However, this is a costly solution, partly due to the somewhat high cost of a metal wheel and partly due to a higher cost of manufacturing bearings having the required low friction. Furthermore, most people prefer that the scroll wheel is capable of scrolling in small, well-defined steps enabling for instance scrolling in steps of one half line in a word-processing software program. If the wheel is to be able to perform free spin, there must be a built-in motor that can disable this functionality at high rotation speeds. Computer mice with such functionality do exist. They typically consist of some hundred single parts, and the result is that manufacturing costs are double or more compared to standard computer mice. Because of the high price, computer mice having free spin capability are not very common. Another reason is that when using free spin, one may lose the feeling of the amount of scrolling that is taking place.

SUMMARY OF THE INVENTION

The present invention changes the functionality of a traditional scroll wheel in such a way that, contrary to known ways, the scroll wheel becomes advantageous for scrolling at both slow and medium speeds.

The invention can build upon a known scroll wheel that is neither construction-wise nor with respect to otherwise built-in functionally is designed for fast scrolling. According to the invention, the scroll wheel has two separate modes of operation, mode 1 and mode 2. The first mode of operation, mode 1, it works like a standard scroll wheel, where the direction of scrolling is related to the direction in which the scroll wheel is turned. According to the invention, a user can switch to a second mode of operation, mode 2, of the scroll wheel by performing an action. In mode 2, the direction of scrolling depends on a first direction of turning of the scroll wheel upon changing the mode of operation to mode 2. Subsequent turning of the scroll wheel in either direction will result in scrolling in the direction that the first direction of turning of the scroll wheel would cause in the standard mode of operation (mode 1). The scroll wheel is returned to mode 1 by the same or a different action than that used for switching the scroll wheel to mode 2.

The invention thus enables an inexpensive scroll wheel to be suitable for scrolling at medium speed. It is medium speed scrolling that most needs improving, since long scrolling in any event is most easily performed using scroll bars on the display; this is a well-known method. What renders a standard scroll wheel not suitable for medium speed scrolling is, as previously mentioned, that it requires continuously turning the scroll wheel, then lifting of the finger, then turning the scroll wheel again, and so on. This is mediated by the functionality provided by the invention; only forward and backward turning of the scroll wheel are necessary in mode 2, not lifting of the finger. Furthermore, it can prevent the loss of sense for how much scrolling one has incurred.

As mentioned, the invention allows a user to switch between to different modes of operation of the scroll wheel.

In the following, examples of such methods are provided.

Method 1: Switching from mode 1 to mode 2 happens when a key is pressed and held, and switching back to mode 1 happens when the same key is released.

Method 2: Switching to mode 2 happens when a key is pressed. Switching back to mode 1 happens by pressing the same or a different key.

Method 3: Switching to mode 2 happens when the scroll wheel's click button is pressed. Switching back to mode 1 happens when the scroll wheel's click button is pressed again.

Method 4: Switching to mode 2 happens as described in one of methods 2 or 3, and switching back to mode 1 happens when the mouse is moved more than a predetermined distance.

Further characteristics can be included, such as:

Addition 1: For a given speed of rotation of the scroll wheel, the scrolling is faster in mode 2 than in mode 1.

Addition 2: If the scroll wheel is of a kind that can be tilted, then horizontal scrolling in mode 2 is faster than in mode 1.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
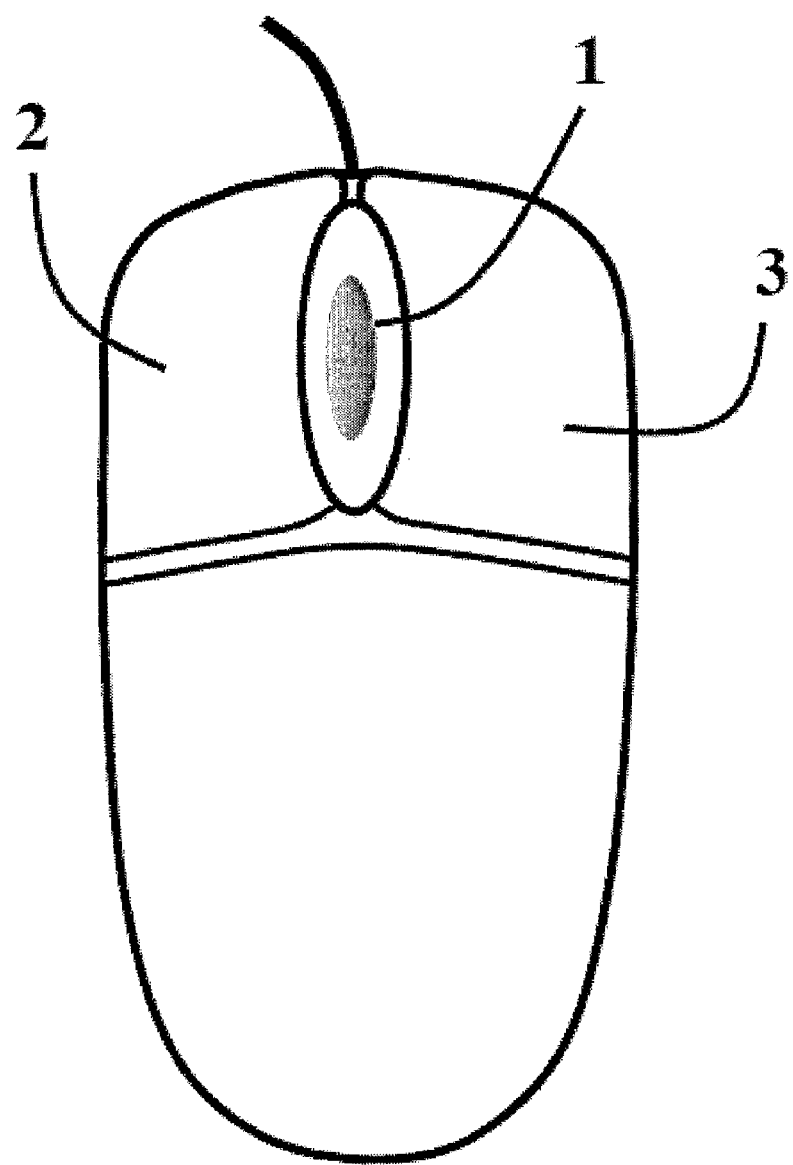
FIG. 1 is a top elevational view of an embodiment of the scroll wheel constructed in accordance with the principles of the present invention.

FIG. 1 is a schematic example of a standard mouse seen from above. Element 1 is the scroll wheel, which is often a plastic wheel covered with rubber. Some scroll wheels can be tilted left or right to cause scrolling to the left or the right, respectively. Furthermore, the scroll wheel can include a click button. Element 2 is a click button that causes a so-called left click. Element 3 is a click button for causing a so-called right click.

Mode 1 corresponds to scrolling in accordance with known principles. In mode 2, programming is adapted so that the scroll wheel operates in accordance with the invention.

Figure 2:
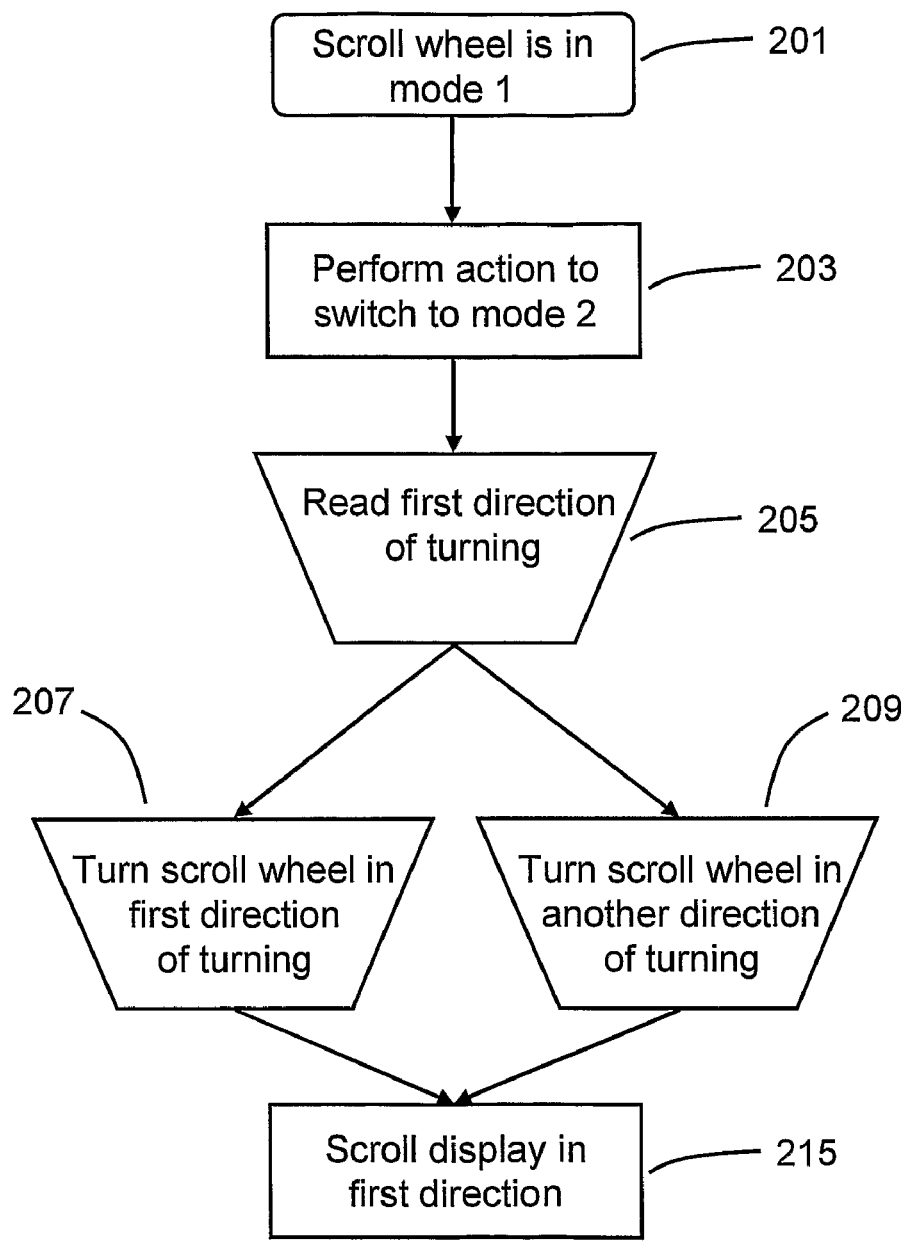
FIG. 2 is a flow chart for a method of the scroll wheel of the present invention.

FIG. 2 shows a flow chart for a method in accordance with the invention. At first, the scroll wheel is in mode 1 (state 201), since the mode switch action has not been performed. When the mode switch action is performed (step 203), the first direction of turning of the wheel is read (step 205), which is the direction in which the scroll wheel is turned. When the scroll wheel is subsequently turned in either the first direction of turning (step 207) or another direction of turning (step 209), the display will be scrolled in the first scroll direction (step 215), thus independently of the subsequent direction of turning.

In mode 1, scrolling occurs in accordance with known principles, i.e. the scrolling on the display reflects the direction of turning of the scroll wheel.

Given the information in this specification, a person skilled can implement the invention, since the invention to a large extent can employ known program procedures. An example that in a very simplified manner reflects the invention, i.e. implements mode 1 and mode 2 and the switching between the two modes, looks like this:

```
============ MOUSE DRIVER PSEUDO-CODE ============
int scrollwheel_direction_first; // first direction of turning of the scroll
wheel
int mode2 = 0;    // start in mode 1, corresponding to scrolling
                  // in a first direction on the display; is effected
by the function
                  // "scroll_in_direction_1". Scrolling in the
// second direction is effected by the function "scroll_in_direction_2"
void set_mode2; // called when mode switch action is performed
{
    mode2 = 1; // switch to mode 2
    scrollwheel_input >> scrollwheel_direction_first; // read first
direction of turning of the scroll wheel
}
void set_mode1; // called when switching back to mode 1, e.g. when
mode switch action is no longer performed
{
    mode2 = 0; // switch to mode 1
}
void display_scrolling(scrollwheel_direction_current); // scrolling as
function of the current direction of turning of the scroll wheel
{
    int scrollwheel_direction_current;
    if ( mode2 ) // if in mode 2...
        display_scroll(scrollwheel_direction_first); // ...then scroll
in the first direction independently of the current direction of turning of
the scroll wheel
    else
        display_scroll(scrollwheel_direction_current); // ...otherwise
scroll up or down depending on the current direction of turning of the
scroll wheel
}
void main( )
{
scroll_loop:
    if ( action_go_to_mode2 ) // if mode switch action causing switch
from mode 1 to mode 2 is performed, then enter mode 2
        set_mode2; // enter mode 2
    if( action_go_to_mode1 ) // if mode switch action causing switch
from mode 2 to mode 1 is performed, then enter mode 1
        set_mode1; // enter mode 1
    scrollwheel_input >> scrollwheel_direction_current; // read
current direction of turning of the scroll wheel
    if ( scrollwheel_direction_current ) // if scroll wheel is turned
    (i.e. scrollwheel_direction_current <> 0)...
        display_scrolling(scrollwheel_direction_current); // ...then
call display_scrolling with current direction of turning of the scroll
wheel as argument
    goto scroll_loop; // read scrollwheel_input and register whether
there is a mode switch action
}
========== END MOUSE DRIVER PSEUDO-CODE ==========
```

The pseudo-code is by and large self explanatory. The function "display_scroll" in the subroutine "display_scrolling" is a pseudoname for the function that causes the actual scrolling of the image on the display. This function is typically accessible via the application programming interface (API) of the program in which the user wishes to perform scrolling.

"action_go_to_mode2", i.e. the action that is performed to switch from mode 1 to mode 2, can for instance be to press and hold a key. The action "action_go_to_mode1" that is performed to switch from mode 2 to mode 1 could be to release the key again. This method was described previously.

Implementation of the other functionalities described herein is just as straightforward for a person skilled in the art.

The invention claimed is:

1. A method for enabling scrolling on a display in a first direction by turning of a scroll wheel on a computer mouse, without requiring lifting a finger from the scroll wheel during use of the computer mouse, the method comprising the steps of:
    changing a scroll wheel mode of operation from a first mode of operation to a second mode of operation by performing an action;
    turning the scroll wheel in a first direction of turning; and
    turning of the scroll wheel in the first direction of turning will cause a scrolling on the display in the first direction and a turning of the scroll wheel in a direction of turning other than the first direction of turning will cause a scrolling on the display in the first direction.

2. The method in accordance with claim 1, wherein switching from the first mode to the second mode happens when a key is pressed, and switching from the second mode to the first mode happens when the key is released.

3. The method in accordance with claim 1, wherein switching from the first mode to the second mode happens when a key is pressed and released, and switching from the second mode to the first mode happens when the key is pressed.

4. The method in accordance with claim 1, wherein switching from the first mode to the second mode happens when a key is pressed and released, and switching from the second mode to the first mode happens when an additional key other than the key is pressed.

5. The method in accordance with claim 1, wherein switching from the first mode to the second mode happens when a click button of the scroll wheel is pressed, and switching from the second mode to the first mode happens when the click button of the scroll wheel is pressed again.

6. The method in accordance with claim 1, wherein switching from the first mode to the second mode happens when a key is pressed and released, and switching from the second mode to the first mode happens when the computer mouse is moved more than a predefined distance.

7. The method in accordance with claim 6, wherein the predefined distance is between 1 and 15 mm.

8. The method in accordance with claim 1, wherein switching from the first mode to the second mode happens when a click button of the scroll wheel is pressed, and switching from the second mode to the first mode happens when the computer mouse is moved more than a predefined distance.

9. The method in accordance with claim 8, wherein the predefined distance is between 1 and 15 mm.

10. The method in accordance with claim 1, wherein a given speed of turning of the scroll wheel causes a faster scrolling in the second mode than in the first mode.

11. A computer implemented process for enabling scrolling on a display in a first direction by turning of a scroll wheel on a computer mouse, without requiring lifting a finger from the scroll wheel during use of the computer mouse, the method being enabled by programmed procedures for a first and a second mode of operation, the method comprising the steps of:

changing a scroll wheel mode of operation from a first mode of operation to a second mode of operation by performing an action;

turning the scroll wheel in a first direction of turning; and providing a programmed procedure for the second mode of operation as such that a turning of the scroll wheel in the first direction of turning will cause a scrolling on the display in the first direction and a turning of the scroll wheel in a direction of turning other than the first direction of turning will cause a scrolling on the display in the first direction.

12. The process in accordance with claim 11, wherein switching from the first mode to the second mode happens when a key is pressed, and switching from the second mode to the first mode happens when the key is released.

13. The process in accordance with claim 11, wherein switching from the first mode to the second mode happens when a key is pressed and released, and switching from the second mode to the first mode happens when the key is pressed.

14. The process in accordance with claim 11, wherein switching from the first mode to the second mode happens when a key is pressed and released, and switching from the second mode to the first mode happens when an additional key other than the key is pressed.

15. The process in accordance with claim 11, wherein switching from the first mode to the second mode happens when a click button of the scroll wheel is pressed, and switching from the second mode to the first mode happens when the click button of the scroll wheel is pressed again.

16. The process in accordance with claim 11, wherein switching from the first mode to the second mode happens when a key is pressed and released, and switching from the second mode to the first mode happens when the computer mouse is moved more than a predefined distance.

17. The process in accordance with claim 11, wherein switching from the first mode to the second mode happens when a click button of the scroll wheel is pressed, and switching from the second mode to the first mode happens when the computer mouse is moved more than a predefined distance.

18. The process in accordance with claim 11, wherein a given speed of turning of the scroll wheel causes a faster scrolling in the second mode than in the first mode.

19. A computer readable medium comprising a plurality of instructions, which when executed, causes a computer to perform the steps of:

enabling scrolling on a display in a first direction by turning of a scroll wheel on a computer mouse;

changing a scroll wheel mode of operation from a first mode of operation to a second mode of operation by performing an action;

turning the scroll wheel in a first direction of turning; and providing a programmed procedure for the second mode of operation as such that a turning of the scroll wheel in the first direction of turning will cause a scrolling on the display in the first direction and a turning of the scroll wheel in a direction of turning other than the first direction of turning will cause a scrolling on the display in the first direction.

20. The computer readable medium in accordance with claim 19, wherein the action for changing from the first mode to the second mode and from the second mode to the first move is selected from the group consisting of a key is pressed and the key is released, a key is pressed and released and the key is pressed, a key is pressed and released and an additional key other than the key is pressed, a click button of the scroll wheel is pressed and the click button of the scroll wheel is pressed again, a key is pressed and the computer mouse is moved more than a predefined distance, and a click button of the scroll wheel is pressed and the computer mouse is moved more than a predefined distance.

* * * * *